UNITED STATES PATENT OFFICE.

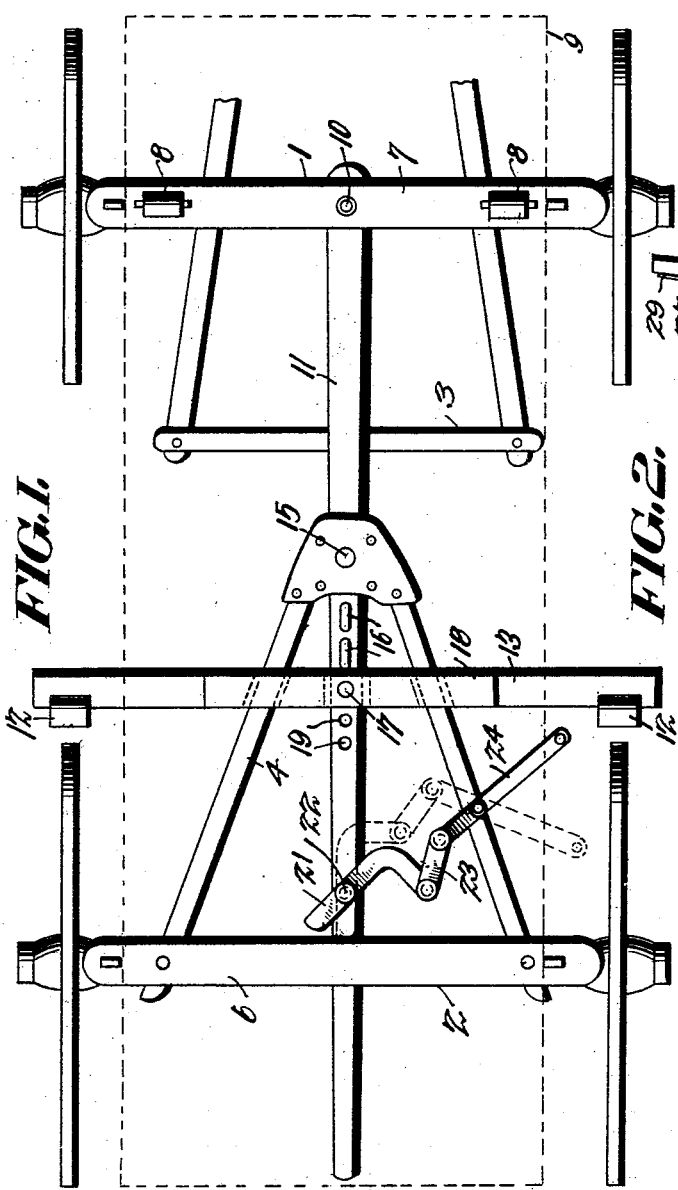

LEWIS PERRY AKINS, OF ATLANTA, GEORGIA.

WAGON-BRAKE.

SPECIFICATION forming part of Letters Patent No. 710,651, dated October 7, 1902.

Application filed February 20, 1902. Serial No. 94,955. (No model.)

*To all whom it may concern:*

Be it known that I, LEWIS PERRY AKINS, a citizen of the United States, residing at Atlanta, in the county of Fulton and State of Georgia, have invented a new and useful Wagon-Brake, of which the following is a specification.

The invention relates to improvements in wagon-brakes.

The object of the present invention is to improve the construction of wagon-brakes and to provide a simple and comparatively inexpensive one which will be automatic in its operation and adapted to brake the hind wheels when the vehicle moves forward on the draft-animals and which may be readily arranged to prevent an application of it when backing a vehicle.

A further object of the invention is to provide an automatic brake of this character which will be adapted to be readily applied to either one-horse or two-horse vehicles.

The invention consists in the construction and novel combination and arrangement of parts hereinafter fully described, illustrated in the accompanying drawings, and pointed out in the claims hereto appended.

In the drawings, Figure 1 is a plan view of the running-gear of a vehicle provided with a brake constructed in accordance with this invention. Fig. 2 is a side elevation of the same, the body of the vehicle being in position. Fig. 3 is a detail view of a portion of the brake-beam.

Like numerals of reference designate corresponding parts in all the figures of the drawings.

1 and 2 designate front and rear axles of the ordinary construction, having front and rear hounds 3 and 4 mounted on them and supporting a front sand-board or bolster 5 and a rear bolster 6. The sand-board or bolster also has mounted on it a rocking bolster 7, which is provided at opposite sides with antifriction-rollers 8, adapted to permit the wagon-body 9 of the vehicle to slide forward over it when the brake is automatically applied, as hereinafter described. The rocking bolster 7 and the front axle are pivotally connected by a king-bolt 10, which also passes through the front end of the reach 11, and any desired form of fifth-wheel may be employed. The reach is slidably connected with the rear axle and the rear hounds and is capable of a limited longitudinal movement or play in the same to permit the rear axle and the body of the wagon in descending a grade to move forward sufficiently to carry the rear wheels in engagement with brake-shoes 12 of a brake-bar 13. The reach extends between the front ends of the rear hounds, and the latter are connected by upper and lower plates 14, through which passes a bolt or pin 15, and the reach is provided with a slot or slots 16 for the reception of the pin or bolt whereby the reach is slidably connected with the rear portion of the running-gear. A series of slots 16 may be provided to enable the running-gear to be lengthened or shortened to suit the character of the load to be hauled or to accommodate wagon-bodies of different lengths. The brake bar or beam 13 is secured to the reach by a pin or bolt 17, and it is slidably connected with the rear hounds, being preferably provided at its upper face with a cleat 18. The cleat and the brake bar or beam are recessed to provide openings for the reception of the reach and the rear hounds, the brake bar or beam being located beneath such parts and the cleat being extended over the same. The reach is provided with a series of openings or perforations 19 for the reception of the bolt 17 to enable the brake bar or beam to be adjusted when the running-gear is lengthened or shortened.

The rocking bolster and the rear bolster are provided with the usual standards, between which is arranged the wagon-body, and when descending a hill or other incline the weight of the load will cause the rear portion of the running-gear, to which the wagon-body is suitably fixed, to move forward on the reach and on the front portion of the running-gear, to which the draft-animals are connected. This will cause the hind wheels of the vehicle to engage the brake-shoes to stop the vehicle. As soon as the draft-animals exert a forward strain on the running-gear the front portion of the latter will be moved forward, and the hind wheels will thereby be relieved of the brake-shoes. By arranging the vehicle-brake in this manner it is adapted to be applied to either one-horse or two-horse vehicles, as the arrangement of the tongue or thills will not affect the application of the brake.

In order to lock the brake out of operation in backing the vehicle, a lever 21 is employed and is fulcrumed between its ends on a pivot 22, and it has a short straight rearwardly-extending arm for engaging the rear bolster, and when it is arranged in alinement with the reach, as illustrated in dotted lines in Fig. 1 of the accompanying drawings, it extends rearward from the pivot and abuts against the rear bolster and holds the brake-shoes in advance of the hind wheels, whereby the vehicle may be backed without applying the brake. The front arm of the locking-lever is substantially L-shaped and extends laterally toward one side of the vehicle and is connected by a short link 23 with a transverse lever 24, fulcrumed between one of its ends on one of the rear hounds and connected at its outer end with an operating-lever 25 by a rod 26. The rod 26 is arranged at one side of the vehicle, and the operating-lever, which is fulcrumed at its lower end on the front portion of the body, is provided with a spring-actuated detent 27 for engaging a curved ratchet 28. The detent or dog is connected with a latch-lever 29 of the ordinary construction, and the ratchet mechanism is adapted to hold the locking-lever in engagement with the rear bolster or out of such engagement. The operating-lever is adapted to be readily oscillated to swing the locking-lever into and out of engagement with the bolster 6, and the brake may be readily arranged either for automatic operation or for backing the vehicle.

What I claim is—

1. In a vehicle-brake, the combination of a running-gear having a reach slidably connected with the rear portion of the running-gear, a brake-beam connected with the reach and located in advance of the hind wheels, a horizontally-swinging locking-lever fulcrumed on the reach and located directly in advance of the rear axle at a point between the same and the brake-beam and capable of being arranged longitudinally of the reach to engage the rear portion of the running-gear to lock the reach and the rear axle rigid with each other to permit the vehicle to be backed, an operating-lever arranged at one side of the vehicle, and means for connecting the operating-lever with the locking-lever, substantially as described.

2. In a vehicle-brake, the combination of a wagon provided with a reach pivotally connected with the front portion of the running-gear and slidably connected with the rear portion of the same, a horizontally-swinging locking-lever fulcrumed on the reach in advance of the rear axle and provided with a straight rearwardly-extending arm and having a forwardly-extending L-shaped arm and adapted to engage the running-gear to lock the brake out of operation to permit the vehicle to be backed, a transverse lever disposed horizontally and fulcrumed on one of the rear hounds and extending to one side of the vehicle, a link connecting the inner end of the transverse lever with the L-shaped arm of the locking-lever, an operating-lever mounted on the body of the vehicle and connected with the outer end of the transverse lever, and a brake-beam located in advance of the hind wheels and connected with the reach, substantially as described.

In testimony that I claim the foregoing as my own I have hereto affixed my signature in the presence of two witnesses.

LEWIS PERRY AKINS.

Witnesses:
E. S. McCANDLESS,
ALLYN H. HAYNES.